United States Patent [19]

Johnsen et al.

[11] Patent Number: 4,644,097

[45] Date of Patent: Feb. 17, 1987

[54] ARMORED SUBMARINE POWER CABLE

[75] Inventors: John N. Johnsen, Oslo; Georg E. Balog, Tranby, both of Norway

[73] Assignee: Standard Telefon og Kabelfabrik A/S, Oslo, Norway

[21] Appl. No.: 770,830

[22] Filed: Aug. 29, 1985

[30] Foreign Application Priority Data

Aug. 31, 1984 [NO] Norway ................................. 843459

[51] Int. Cl.⁴ .............................................. H01B 7/22
[52] U.S. Cl. ............................. 174/102 R; 174/68 R; 174/88 C; 174/89; 174/93; 174/108
[58] Field of Search .................. 174/102 R, 108, 136, 174/68 R, 88 C, 89, 93

[56] References Cited

U.S. PATENT DOCUMENTS

| | | | |
|---|---|---|---|
| 2,873,307 | 2/1959 | Horn | 74/102 R |
| 3,634,607 | 1/1972 | Coleman | 174/108 X |
| 3,874,960 | 4/1975 | Matsuzaki et al. | 174/88 C X |
| 3,980,808 | 9/1976 | Kikuchi et al. | 174/108 X |
| 4,164,621 | 8/1979 | Silva | 174/88 C X |
| 4,224,462 | 9/1980 | Occhini et al. | 174/68 R X |
| 4,259,543 | 3/1981 | Oldham | 174/70 S |
| 4,317,000 | 2/1982 | Ferer | 174/108 X |
| 4,415,764 | 11/1983 | Priaroggia et al. | 174/136 X |
| 4,427,262 | 1/1984 | Oldham | 174/89 X |
| 4,570,032 | 2/1986 | Charlebois et al. | 174/93 X |

FOREIGN PATENT DOCUMENTS 1465552  4/1969  Fed. Rep. of Germany .

Primary Examiner—Arthur T. Grimley
Assistant Examiner—Morris H. Nimmo
Attorney, Agent, or Firm—John T. O'Halloran; Mary C. Werner

[57] ABSTRACT

Armored submarine power cables are designed for laying in waters with varying depths. The cable has an armor which is heavy and strong (steel wires) in shallow water sections. In very deep waters the weight of steel armor is prohibitive so that in these sections the armor is made of synthetic light weight material. The transitions between the two types of armor are made physically concentrated but flexible enough to prevent sharp bends of the cable core as it passes cable laying machinery. The armor joint may be displaced from cable core joints and substantially effectively transfers all longitudinal strain in the cable.

11 Claims, 15 Drawing Figures

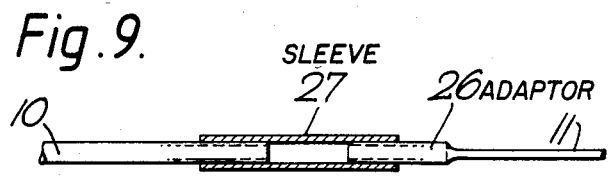
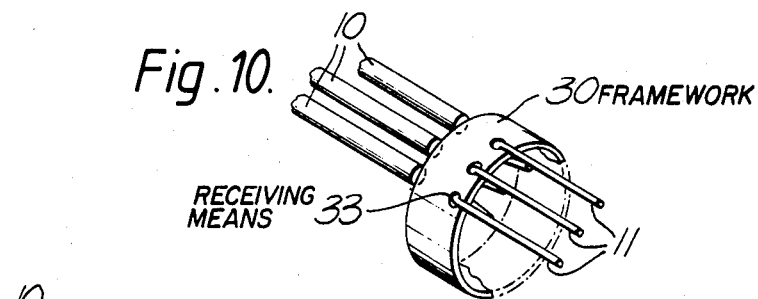
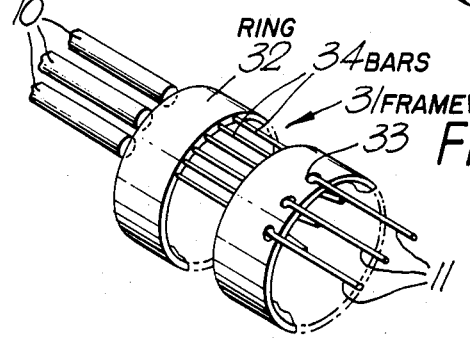
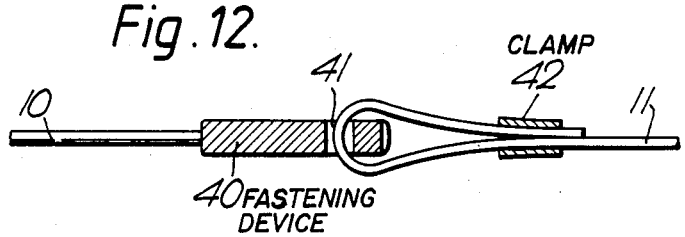

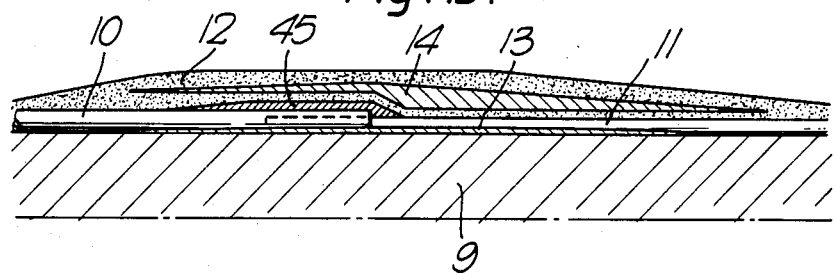
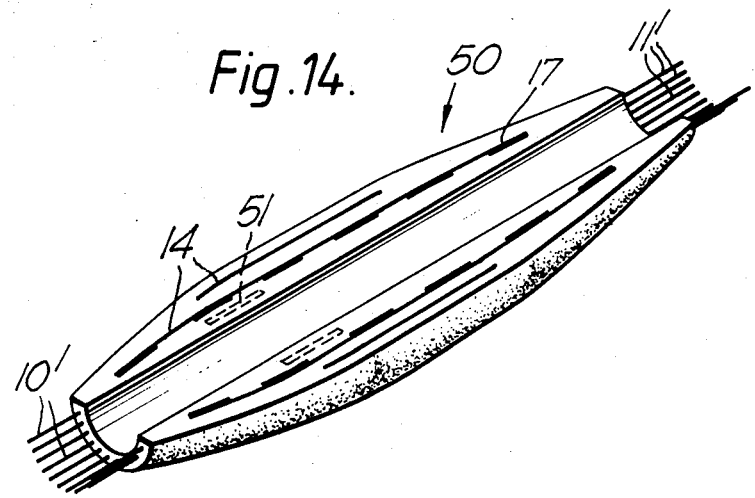
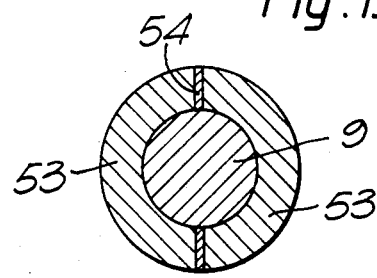

ARMORED SUBMARINE POWER CABLE

BACKGROUND OF THE INVENTION

The present invention relates to submarine power cables and in particular to armored submarine cables.

Ordinary cables have copper conductors, lead sheath and steel wire armor. The high density of the metals will create very high tension in the cable during laying. Such high tension may be harmful to the cable, especially to the insulation when the cable is bent over the capstan and the laying wheel of the cable ship. It is therefore desirable to use a light weight cable at parts of the route with great sea depths. This can be obtained by replacing the said metals with lighter materials, for instance copper with aluminum, lead with aluminum and steel with synthetic fibres.

The cables may also be exposed to torsional forces which could create twist of the cable. The undesirable torsional forces are usually eliminated by using a double armor or a so-called cross armor, where two armor layers are applied with opposite stranding direction.

During operation, the cable may be exposed to strain due to fishing tackle, ships anchors, etc. and in very shallow waters to wear and tear due to movement because of waves and/or sea currents. All these kinds of mechanical impacts may damage the cable.

It is possible to minimize the risk of damage to the cable in areas where such mechanical impacts may occur, for instance by embedding the cable at the sea bottom. However, such embedding may be very expensive depending on the bottom conditions, sea depth, etc. A more economical solution will therefore usually be to make the cable selfprotective by designing it with a heavy armor, as mentioned. Such a cable will withstand the mostly used fishing tackles, anchors from fishing boats etc. Experience has demonstrated that a cross-armored cable is very good with regard to such impacts. In other areas of the route, where no fishing takes place and where the risk of damage by anchoring etc. is small, the armor may then be reduced, making the cable at such parts lighter and less expensive.

Since the steel wire armor often contributes to about 50% or even more of the weight of the cable, the replacement with synthetic fibres, e.g. Kevlar, will be a very important factor in the attempt to reduce the weight of the cable. Synthetic fibres will, however, not provide sufficient protection against fishing tackles, etc. during service, but at very great sea depths fishing and anchoring are hardly of any concern at all.

The technique of using a combination of heavy armor of the cable in shallow waters and a light armor (light weight cable) where the cable passes deep waters, has been used in connection with telecommunication cables.

From Electrical Communication, Vol. 49, No. 2, 1974, pgs 177-182 there are known deep ocean type cables having non-metallic armor. There are described coaxially designed power and communication cables suitable for connecting a surface vessel with seabed installations. In order that the cable should be able to carry its own weight down to an operating depth of 6000 meters the usual steel armor is exchanged with a synthetic fiber armor essentially containing DuPont PRD-49 fibers (Kevlar).

In Electrical Communication Vol. 49, No. 2, 1974 pgs 362-369 is described the Cantat-2 Submarine Cable System which was installed between the UK and Canada in 1973. The cable route passed through shallow as well as deep waters, and the coaxial telecommunication cable was designed to have two layers of heavy gauge mild steel wire armor at depths less than 73 meters, single layer steel wire armor at depths between 73 meters and 926 meters while the deep water cable section had no protective armor. The transition from the armored cable to the light weight deep sea cable was constituted by a one nautical mile (1.85 km) long cable having a light weight armor consisting of PVC covered mild steel wires.

Inasmuch as the cable in Electrical Communication is of the communication type including a plurality of repeaters and equalizers, the joints between the various sections of the cable were made at the repeaters. The external cable armor of the armored cable sections and the center high tensile steel strength member of the light weight cable sections were probably secured to the repeater housings.

SUMMARY OF THE INVENTION

The object of the present invention is to provide a submarine cable and in particular an armored submarine power cable which has a sufficiently smooth but still relatively "concentrated" transition of the cable's stiffness, so as to be especially fit for a submarine cables layed in a route passing shallow waters.

This object and others which will become apparent hereinafter are accomplished by the present invention which provides a core containing conductors and a layer of armoring disposed on the outside of and surrounding the core, the layer including at least one section of heavy armor including at least one layer of heavy metal wires having ends in order that the cable may withstand mechanical forces applied thereto, at least one section of lightweight armor having ends, and a transition region in which the armor section and the lightweight armor section are joined in a manner such that the stiffness and flexibility of the cable are controlled.

The invention is particularly useful for cables with a heavy steel wire armor in the shallow waters and with a non-metallic armor in deep waters. The defined armor joints may be made in the factory or on site when installing the cable. Normally the armor joint is located in the same area as the cable core joint, but in certain cases the cable core is made in continuous lengths and the armor is provided and jointed at places displaced from the core joints.

BRIEF DESCRIPTION OF THE DRAWING

Above mentioned and other features and objects of the present invention will become more apparent from the following detailed description of embodiments of the invention taken in conjunction with the accompanying drawings, where FIG. 1 schematically illustrates a cable route passing through shallow as well as deep waters;

FIGS. 6 and 9 illustrate various arrangements of interconnecting the armor elements;

FIGS. 10-12 schematically show the use of a framework or structure for interconnecting the armor elements;

FIG 13 illustrates an alternative armor joint;

FIG. 14 shows a half-sleeve in which armor joints and bend restrictions are incorporated; and FIG. 15 illustrates two half-sleeves fixed together.

DETAILED DESCRIPTION OF THE PREFERRED EMBODIMENT

Figure 1:
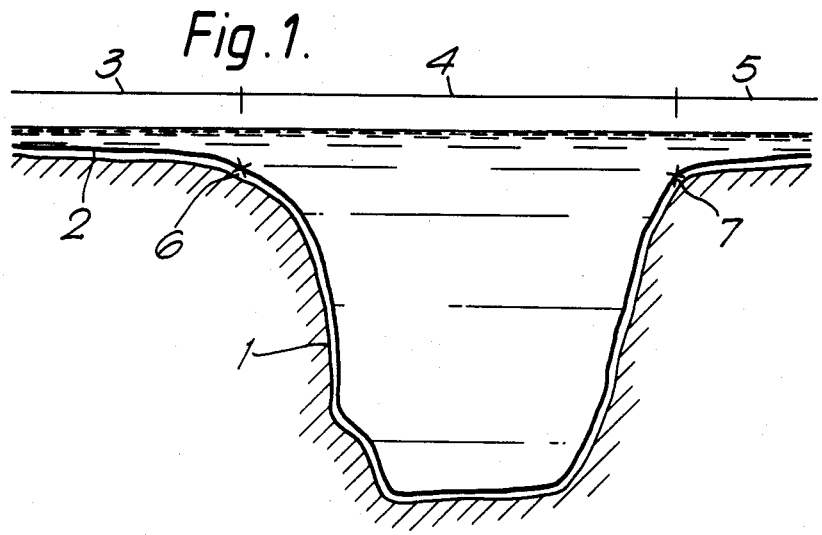

FIG. 1 illustrates the cross-section of a cable route 1 and a cable 2 in accordance with the present invention having metal wire armor in the shallow water sections 3 and 5 and light weight non-metallic armor in the deep water section 4.

The transitions 6 and 7 between the shallow and deep water sections of the cable 2 are made so as to obtain a gradual and controlled change in the flexibility of the cable. Whereas the armor of the shallow water cable includes one or more layers of steel wires which result in a rather rigid cable, the light weight non-metallic armor of the deep water cable will result in reduced rigidity of this cable section. Due to the high weight of the cable it will be desirable to design the cable so that the armor of all sections or at least the deep water section is torsion free.

Figure 2:
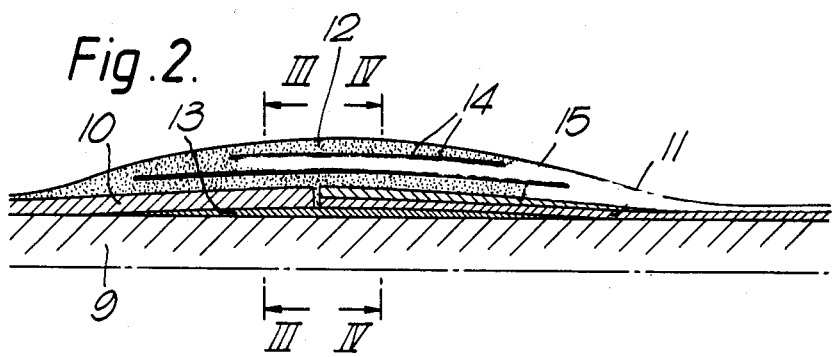
FIG. 2 schematically shows a longitudinal partial cut through an armor joint.
Figure 3:
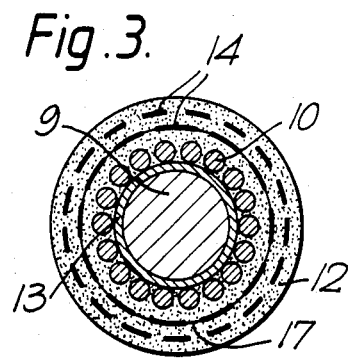
FIGS. 3 and 4 schematically show cross-sections of the armor joint of FIG. 1.
Figure 4:
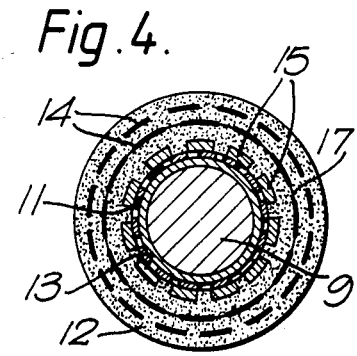

In FIGS. 2, 3 and 4 are schematically shown a cable core 9 and one layer of armor wires 10 jointed to a layer of non-metallic armor elements 11. The cable core 9 includes one or more insulated conductors provided with normal protective layers and sheaths underneath the armor. The end portions of the armor wires and elements should preferably be treated with mechanical and/or chemical means so as to increase the surface areas before applying a synthetic jointing material 12. The jointing material 12 which preferably could be an epoxy resin may be applied by pressure molding or by other means. Experiments have proven that such joints are capable of transferring the longitudinal strain required.

In order to improve the strain relieving properties of the joint there should preferably be arranged a tapered layer 13 over the core 9 or core joint (not shown), which layer should have good adhesive properties towards the cable core 9. The purpose of this layer 13 is also to increase the diameter of the cable core 9 somewhat so as to facilitate application of the jointing material 12 around the various parts and elements of the joint. A tapered filler element or elements 15 may be introduced over the smaller diameter armor 11.

In order to add to the flexibility of the joint the configuration of the jointing material body 12 is given a tapered cross-section as shown. In addition there may be placed a bend restrictor (not shown) of known type over the joint. Bend restricting means may alternatively be built into the jointing material body 12 as indicated with elements 14 and 17.

A preferred length of the armor joint should be between 1 m and 10 m depending on cable dimensions, cable tension, etc.

Figure 5:
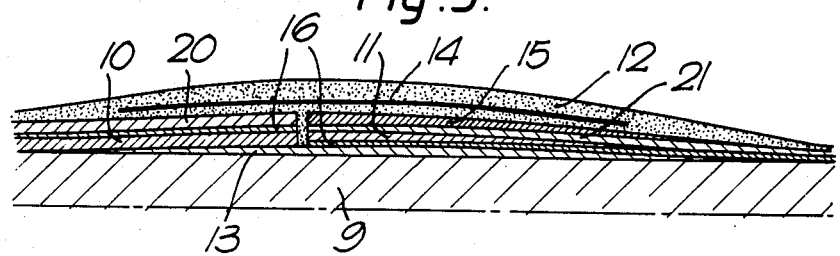
FIG. 5 illustrates a double layer armor joint.

In FIG. 5 is illustrated a double layer armor joint between armor wires 10, 20 and light armor elements 11, 21. Tapered layers 13 and 16 are indicated. Alternatively the joints of the two layers should be displaced from each other.

Figure 6:
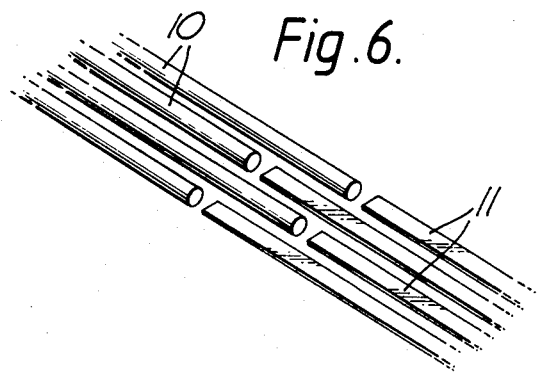

In FIG. 6 is illustrated a way of jointing the two types of armor 10 and 11 of FIG. 2 and 5, where the armor elements are cut so as to interleave. When applying the jointing or molding material 12 the armor layers will be efficiently bonded together, so that longitudinal strain in the cable will be transferred from one armor layer to the other so as to relieve the cable core of strain.

Figure 7:
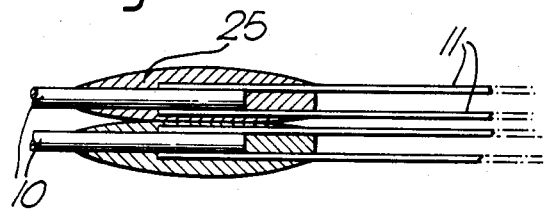
Figure 8:
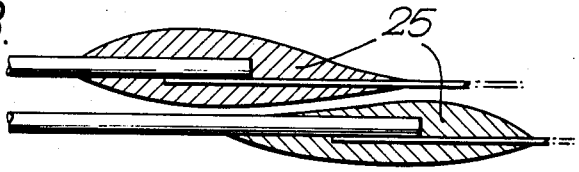

In FIGS. 7 and 8 there are schematically illustrated two arrangements for molding together the two types of armor elements 10, 11 in one layer. The individual joints 25 are not shown to scale relative to the size of the armor elements.

FIG. 9 illustrates armor elements 11 provided with an adaptor device 26 so that the two armor elements 10 and 11 may be interconnected with a sleeve 27.

FIGS. 10 and 11 illustrate the armor elements 10 and 11 of the two types of armor jointed or united by means of a framework 30, 31. The heavy metal armor wires 10 are welded or soldered to the framework 30 in the form of a cylindrical ring or to a similar ring 32 on the framework 31. The right hand side of the framework 30, 31 is provided with means 33 suitable for receiving the elements of the light weight armor 11. When the light weight armor 11 is of synthetic material such as Kevlar fibers or strings or tapes, the connection may be obtained by molding. An epoxy resin may be suitable for making a good connection. In the framework 31 the left and right hand sides are interconnected with bars 34 capable of taking up all the strain in the cable. The framework, 30, 31 should preferably be as short as possible so as not to introduce unnecessary rigidity in the joint.

FIG. 12 illustrates the metal armor element(s) 10 welded to a device 40 (which could be part of the networks 30, 31) having an aperture 41 through which the armor element 11 may be fastened by e.g. a clamp 42.

FIG. 13 schematically illustrates an armor joint placed on a cable core 9. The heavy armor elements 10 are jointed to the light weight armor elements 11 by placing a layer of epoxy 45 over and around the end portions of the armor elements. The ends may be interleaved as illustrated in FIGS. 6 and 8 or abutting as illustrated in FIGS. 2, 5 and 7. The joint between the two sets of armor may alternatively be effected via a mechanical framework like those illustrated in FIGS. 10 and 11. In the case where metal armor is also used in the light weight cable section, the two sets of armor may be jointed by welding or soldering. The layer (filling) 13 is optional, whereas the bend restrictor elements 14 may be made of various materials, preferably metal, and may have various shapes. Finally, the armor joint is embedded in a body 12 of synthetic material.

The arrangement of FIGS. 2-13 may be realized as a circular arrangement to be constructed during manufacture of the cable armor. Alternatively, these arrangements may be incorporated in a premade cylindrical sleeve through which the cable runs, during the manufacturing process. When the desired position is reached, the sleeve can be applied and the type of armor can be changed. Such a sleeve should contain premade joints between short pieces of the two types of armor as well as bend and strain restricting means as illustrated in FIGS. 2 and 5. When, during the manufacturing process, one section of the cable core has been provided with one or more layers of heavy type armor, and it is desired to have a light weight armor on the next section, the armor sleeve can be moved into position whereupon the end portions of the heavy type cable armor elements are jointed one by one in an ordinary armor joint, to the heavy type armor elements extending from the sleeve. Thereafter the light weight armor elements of the sleeve are jointed in an ordinary armor joint to the elements of the light weight armor to be applied to the next section of the cable core. This sequence of actions is of course reversed at the other side of the cable route if that side is to be provided with heavy type armor. When a cross-armored cable is concerned the sleeve may contain joints of both armor layers or there may be used two displaced sleeves, one for each armor layer.

FIG. 14 illustrates a split sleeve which incorporates premade armor joints in accordance with FIGS. 2-13 as well as bend restricting means. In the case of a split sleeve 50 a framework 30, 31 or other types of framework must of course also be split in two. As illustrated at 51, parts of a framework which unite the two types of armor 10 and 11 (and possibly 20 and 21) may extend from the two sleeve halves so as to facilitate a secure bond between the two halves. The sleeve 50 may in addition to longitudinal bend restricting elements 14 also be provided with circumferential elements 17. FIG. 15 illustrates the two halves of the sleeve 53 effectively molded together or united by flexible adhesive material 54. The two sleeve halves may also be united by external clamping devices. The split sleeve construction could be used to combine the joints of a multi-layer armor cable if the length of lay of the armor layers allows such construction.

With the described embodiments of the present invention there are obtained flexible but rather concentrated cable armor joints. Flexible adhesive molding material which may be used includes flexible epoxy, flexible polyurethane, acrylates and other materials which are capable of transferring longitudinal strain and which are still flexible enough to allow passing of the armor joint over capstans and laying wheels of the cable ship.

Whereas the abrasion resistance of synthetic armor is not as good as could be desired, it may be necessary in certain cases to place one or two galvanized steel tapes around the synthetic armor. Such steel tapes should be thin so as not to add substantially to the weight of the light weight cable.

Although the above description is mainly concerned with cables which pass both shallow waters and very deep waters and which in the shallow waters are designed with a heavy metal wire armor and in deep waters are designed with an armor of synthetic fibres, the present invention is applicable to any type of cable which in consecutive sections is provided with at least two different types or dimensions of armor.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An armored submarine cable having varying mechanical strength comprising:

a core containing a conductor;
   at least one section of heavy armor surrounding and extending longitudinally along said core and including at least one layer of heavy metal wires having ends such that the cable may withstand mechanical forces applied thereto,
   at least one section of lightweight armor having ends surrounding and extending longitudinally along said core adjacent said heavy armor section; and
   a transition region in which said heavy armor section and said lightweight armor section are joined in a manner such that a gradual and controlled change in the stiffness and flexibility of the cable is obtained.

2. The cable according to claim 1 wherein said heavy metal wires are formed of galvanized steel and said lightweight armor is formed of a non-metallic material.

3. The cable according to claim 1 wherein said transition region includes said ends of said heavy metal wires and said ends of said lightweight armor in either one of an overlapped or an abutting relationship.

4. The cable according to claim 1 wherein said transition region includes a framework having opposed end regions, one of said end regions being joined to said ends of said heavy metal wires and the other of said end regions being joined to said ends of said lightweight armor.

5. The cable according to claim 3 further comprising a layer of at least one of a filling and a strain relieving material disposed along the inner surface of said heavy metal wires and said lightweight armor to increase the diameter of said core and provide longitudinal gaps between a majority of said ends of said heavy metal wires and said lightweight armor.

6. The cable according to claim 5 wherein said transition region further includes a synthetic material having adhesive properties applied to said ends of said heavy metal wires and said lightweight armor and along a predetermined length thereof and to said gaps.

7. The cable according to claim 6 wherein said transition region further includes bend restricting means having at least one longitudinal bend and strain relieving element.

8. The cable according to claim 6 wherein the synthetic material is selected from the group consisting of flexible epoxy, flexible polyurethane and acrylates.

9. The cable according to claim 6 wherein said transition region further includes bend restricting means having at least one circumferential bend and strain relieving element.

10. The cable of claim 1 wherein said transition region further comprises a sleeve positioned between and joining said ends of said heavy armor section and said ends of said lightweight armor wires.

11. The cable of claim 10 in which said sleeve includes at least two longitudinal sections which are joined together.

* * * * *